United States Patent [19]
Chung

[11] Patent Number: 5,365,460
[45] Date of Patent: Nov. 15, 1994

[54] NEURAL NETWORK SIGNAL PROCESSOR

[75] Inventor: Hwang Chung, Irvine, Calif.

[73] Assignee: Rockwell International Corp., Seal Beach, Calif.

[21] Appl. No.: 572,296

[22] Filed: Aug. 27, 1990

[51] Int. Cl.$^5$ .............................................. G06F 15/18
[52] U.S. Cl. .................................... 364/516; 364/517; 382/14
[58] Field of Search .......................... 356/4, 320, 326; 364/916.2, 807, 516, 517, 972.4, 900; 342/160, 192, 90, 91, 159; 382/14, 15, 9; 358/95, 105; 370/123; 307/201; 395/23, 25, 2, 11; 348/155, 31

[56] References Cited

U.S. PATENT DOCUMENTS

| | | | |
|---|---|---|---|
| 4,885,757 | 12/1989 | Provence | 364/807 X |
| 4,888,724 | 12/1989 | Marom et al. | 364/807 |
| 4,905,239 | 2/1990 | Lockwood et al. | 370/123 |
| 4,965,725 | 10/1990 | Rutenberg | 382/15 X |
| 4,976,520 | 12/1990 | Brandstetter et al. | 364/807 X |

OTHER PUBLICATIONS

"An Introduction to Computing Neural Nets", Richarcd Lippmann; IEEE ASSP Apr. 1987 pp. 4–22.
"Infrared transient sensing"; D. D. coon et al.; Optical Engineering Jun. 1988, vol. 27 #6 pp. 471–474.

*Primary Examiner*—Tod R. Swann
*Attorney, Agent, or Firm*—David J. Arthur; Charles T. Silberberg

[57] ABSTRACT

An apparatus and method using a neural network processor for target detection is described. An array of injection mode infrared detectors, whose output signals convey intensity change information of detected objects in a pulse train output form is combined with a frequency division multiplexer to apply the information to a minimum number of multiplexed channels, and transmit the detector output signals to the processor in a continuous mode. A multi-layer neural network processor is used to localize global information and concentrate on areas of interest through matrix transformation applied by the various neural layers.

26 Claims, 10 Drawing Sheets

NEURAL NETWORK SIGNAL PROCESSOR

BACKGROUND OF THE INVENTION

The subject invention relates to signal processing, particularly for identifying and analyzing information that changes against an unchanging or slowly changing background. The invention is particularly useful in processing image information from an array of infrared detectors.

Conventional target detection using infrared (IR) passive sensors is based upon conversion IR energy into electrical signals. Due to noise from various signal sources, such as the optics, detectors, and the electronic circuits, the raw signal to noise ratio (SNR) s typically so low that it is necessary to improve the SNR by integrating the detector output signals during a certain period of time. This process is "called integrate and dump" and usually is combined with the pre-amplification of the detector output signals. The circuitry to perform these functions increases the complexity of the focal plane electronics, and increases the power requirements for the device.

Since a typical passive sensor consists of a 512×512 or 1024 ×1024 array of detectors, the signals from the detector array are multiplexed in the time domain so that they can be read out using a reduced number of output channels from the detector array to the other signal processing circuitry. The time division multiplexed signals are then digitized through an analog to digital converter (ADC). The two processing functions, time division multiplexing, and analog to digital conversion, require a very high sampling rate, and cause aliasing for wide-band signals, which results in signal distortion.

In practical operation of a focal plane array, the infrared energy received on the focal plane represents images that are cluttered by heavy background information. The type of background information depends upon the orientation of the focal plane relative to the desired observation, such as an earth background, space background, and so forth. Therefore, target detection in the background has been considered for some time as a very challenging process. This target detection consists of two parts. The first is to remove the background clutter from the target, and the other is to detect target motion. The conventional technique to remove the background clutter is frame to frame subtraction of the image on the focal plane. Target motion detection can only be accomplished by complex state estimation algorithms and/or correlation on the frame to frame data. Computations of these algorithms is complex, time consuming, and consequently requires a very high throughput processors and considerable electrical power.

Thus, the conventional processing technique for IR detector signals requires multistage signal processing for the pre-amplification, time division multiplexing, analog to digital conversion, background removal, and target motion detection functions.

SUMMARY OF THE INVENTION

The present invention is a processor for detecting target position and motion against a background using neural network processing to eliminate many of the stages required in conventional IR detector signal processing.

The invention includes an array of detectors, such as injection mode infrared radiation detectors. Each of the detectors produces a pulse train having a frequency within a unique one of a plurality of predetermined frequency ranges. A frequency division multiplexer has input terminals connected to the infrared detectors and an output terminal connected to a communication channel for multiplexing the pulse trains onto the communication channel in the frequency division mode. A neural network processor is connected to the communication channel for identifying the frequency range in which a change in the frequency of the pulse train occurs.

The neural network processor demultiplexes the pulse train having frequencies within a predetermined band of frequencies, and detects in which one of the bands of frequency a change in pulse train frequency occurs. The neural network processor further demultiplexes the pulse train frequencies within the identified band of frequencies to individual pulse train frequencies and correlates the changing frequency to its associated detector.

A neural network processor is advantageous for use in the invention. A neural network can be adaptively trained for operation in a particular environment, and can quickly process large amounts of data.

DETAILED DESCRIPTION OF THE PREFERRED EMBODIMENTS

Figure 1:
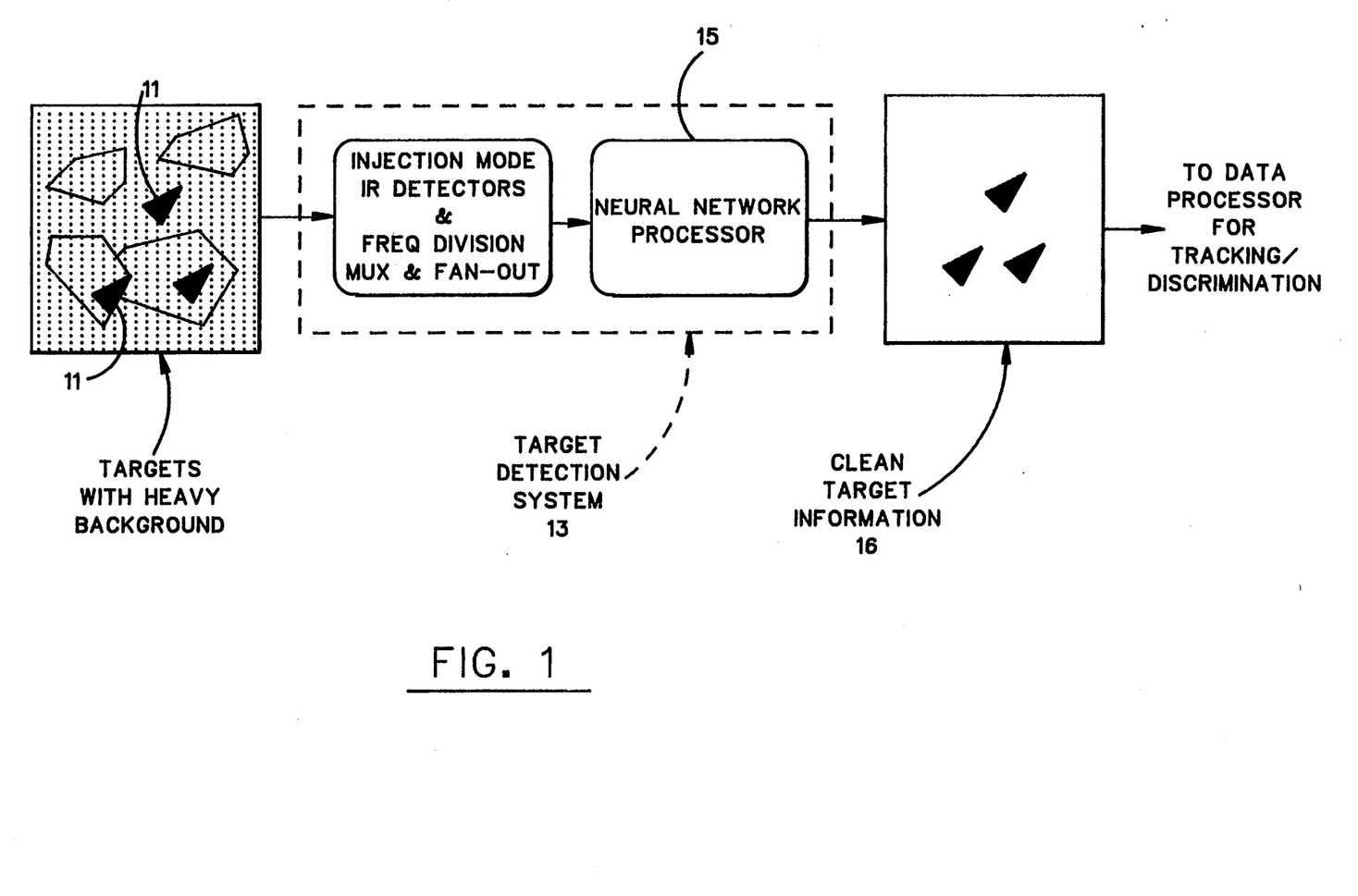
FIG. 1 illustrates the process of detecting targets together with background information to obtain clean target information using the invention.

Shown conceptually in FIG. 1 is a group of moving targets 11 to be detected, but cluttered with heavy background information. The target detection system 13 detects the targets and background information, and processes such information to isolate the target data through a neural network processor 15 to produce clean target information 16. The clean target data 16 may then be applied to a data processor for further analysis, such as target tracking and/or target discrimination.

Figure 2:
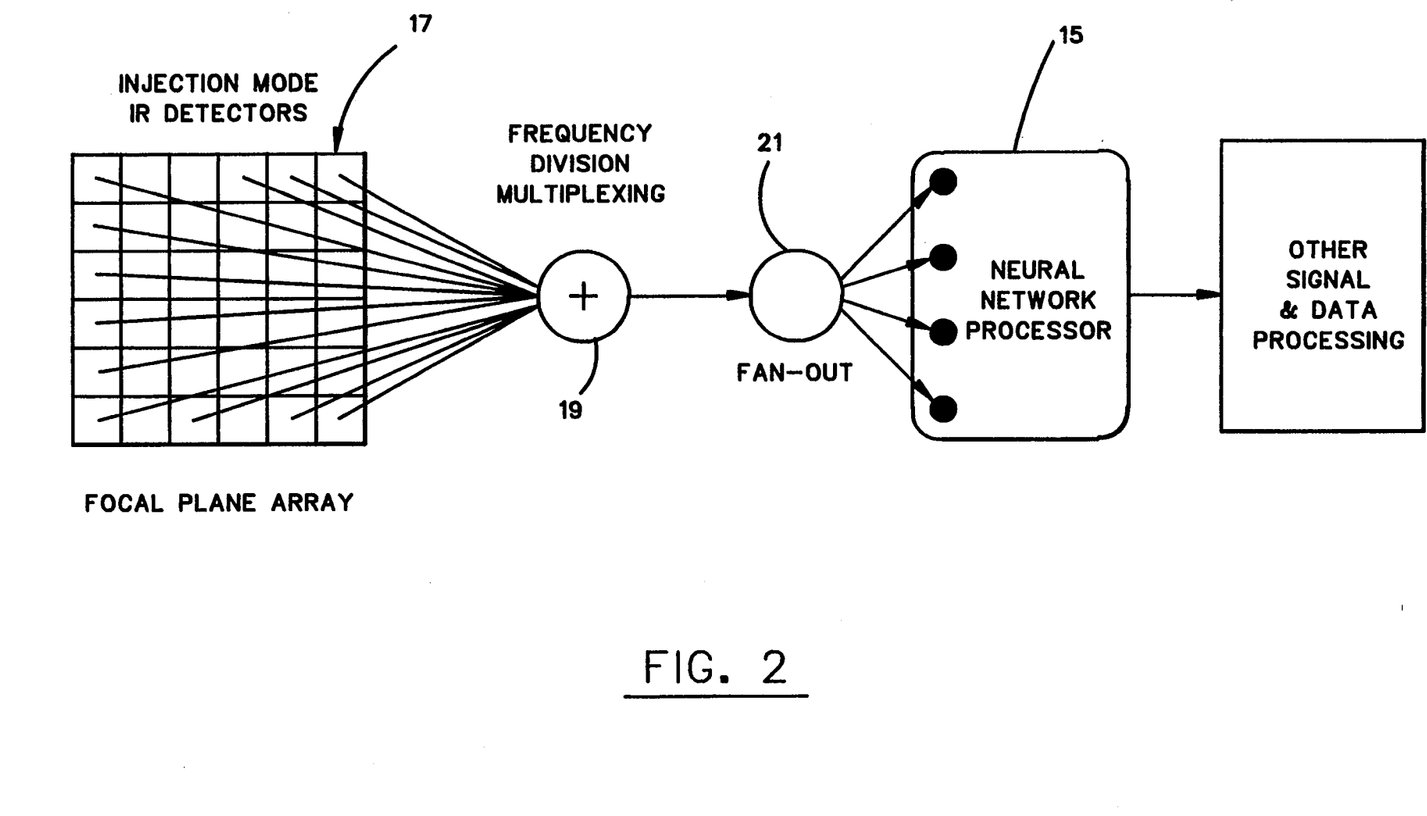
FIG. 2 is a conceptual illustration of the target detection system of the invention.

The approach of the invention uses the following three main elements as shown in FIG. 2: a) an injection mode infrared detector array 17, b) a frequency-division multiplexer 19 and fan-out element 21, and c) a processor 15 to extract the target data. The output of an injection mode IR detector is a pulse train similar to the depicted in FIG. 3b. The frequency-division multiplexing and fan-out processing includes frequency indexing, frequency multiplexing, and fan-out. Finally, the network processing includes frequency bank processing, frequency gradient detection, frequency zooming, frequency change correlation, and frequency mapping to motion.

INJECTION MODE INFRARED DETECTOR

Figure 3A:
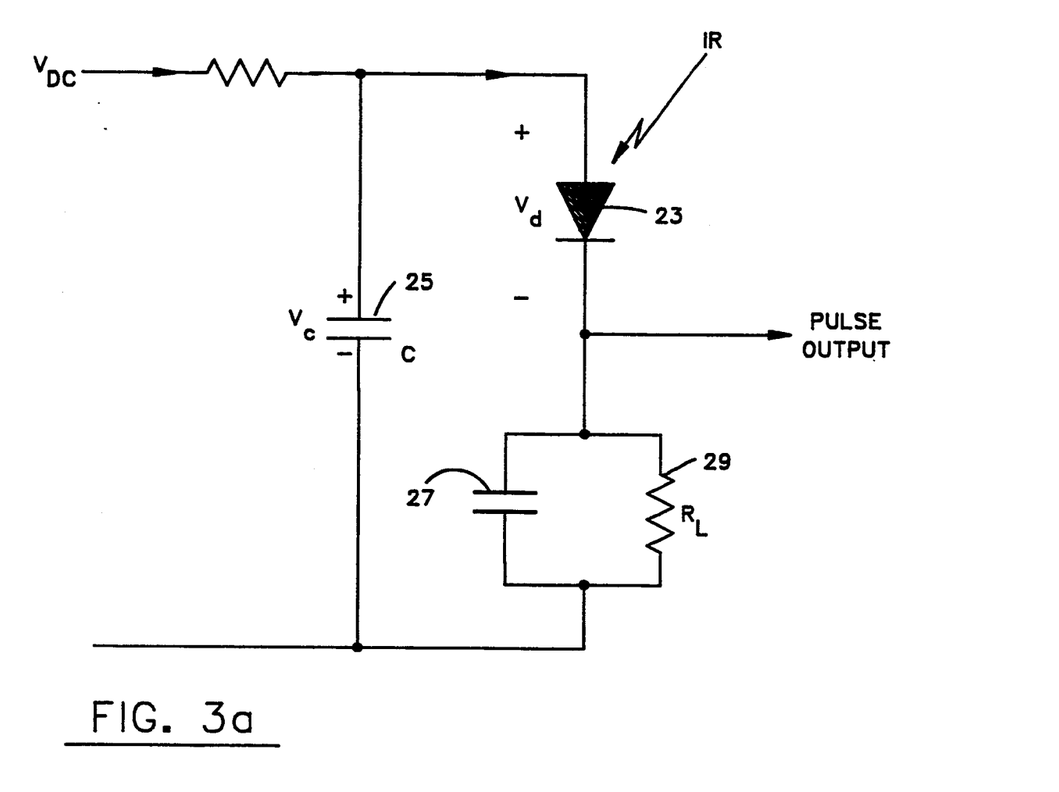
FIG. 3 is a circuit diagram of the injector mode IR detector used in the focal plane array.
Figure 3B:
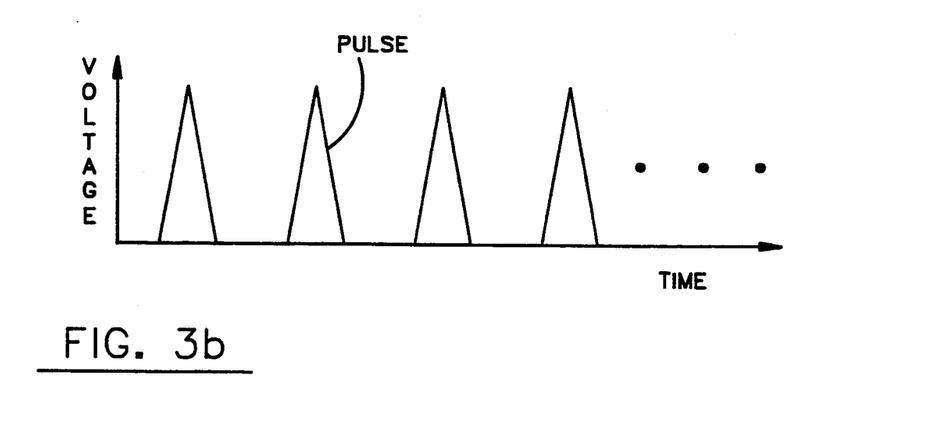
Figure 4:
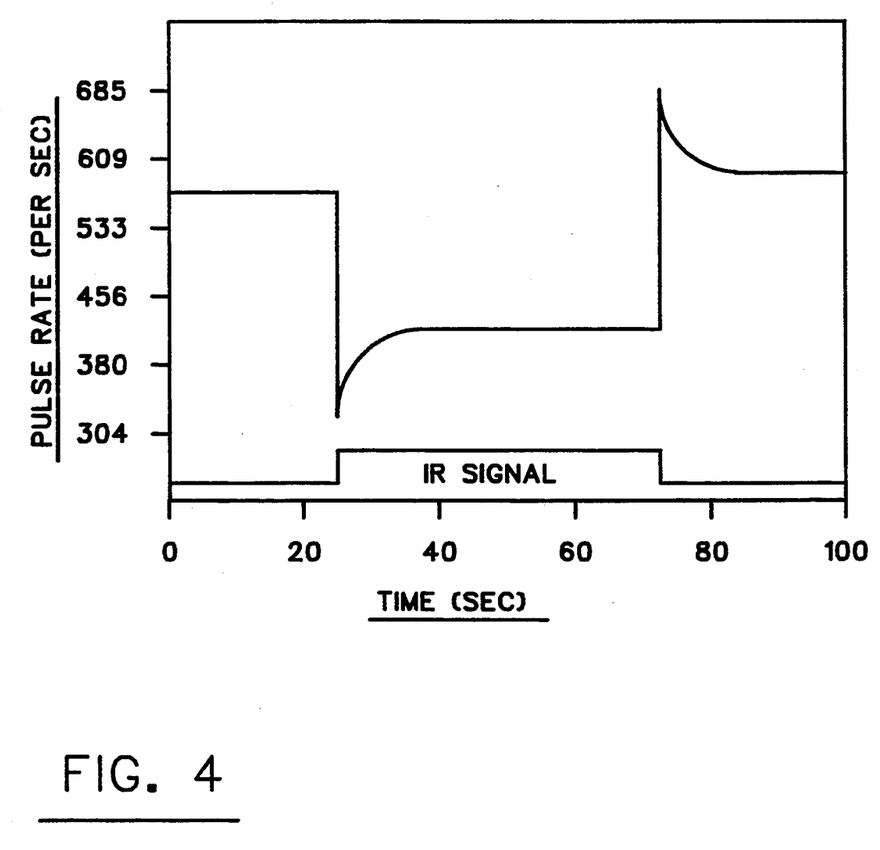
FIG. 4 is a plot of the detector output pulse rate as a function of IR illumination.

In a steady-state signal case, the output of the injection mode IR detector (IMID) Is a neuron-like pulse train having a repetition rate that depends upon the intensity of the IR source as well as circuit parameters. This is described by D. D. Coon et al., "Infrared Transient Sensing," *Optical Engineering*, Vol. 27, No. 6, pp. 471–474 (June 1988). A diagram of the IMID circuit is shown in FIG. 3a. The pulse train produced is shown in FIG. 3b. A sudden exposure or removal of IR source abruptly changes the output pulse rate of the circuit, as shown in FIG. 4. This phenomenon is very similar to an actual biological neuron inhibitory response, and is used to support frequency indexing and frequency-division multiplexing in the target detection system.

The distinctive feature of the injection mode IR detector circuit in FIG. 3 is the self-inhibiting (compensating) response of the circuit. When the diode 23 in the circuit is off, the voltage across the diode $V_d$ equal to the voltage across the capacitor 25 $V_c$. As soon as the diode is turned on, i.e., placed in a conducting state, a fast transfer of charge from the capacitor 25 onto the load capacitor 27 occurs. After the charge transfer s accomplished, the capacitor 25 is recharged by the current through the resistor 29 as much as the amount of the charge transferred. Each time the diode 23 is switched to a conducting state, approximately the same amount of charge is transferred through the diode. Exposure of the diode to IR radiation changes the diode switching rate (on and off rate). An increase in the diode switching rate tends to discharge the capacitor 25 and leads to a slight reduction in $V_c$. This voltage drop in $V_c$ immediately results in a partially compensating (self-inhibiting) reduction in the diode switching rate. As the result, the corresponding output pulse rate of the circuit is abruptly decreased due to the compensating response of the circuit as shown in FIG. 4. Similarly, removal of IR source from the circuit results in a decrease in the diode switching rate, and this leads to an increase in $V_c$ and a partially compensating increase in the switching rate. (See D. D. Coon, et al)

Therefore, this change in the diode switching rate allows possible detection of targets in the sensor field-of-view by observing the changes in the detector output pulse rate.

FREQUENCY DIVISION MULTIPLEXING AND, FAN-OUT

The focal plane array consists of an array of detectors. Each pixel can be uniquely identified, or "indexed," according to its output frequency. There are two ways to achieve frequency indexing: a parametric method and an external modulation method.

The parametric method is based upon the fact that the output pulse rate depends upon circuit parameters such as diode bias current and RC constant in the detector circuit shown in FIG. 3(a). Thus, by changing each parameter or a combination of both, it is possible to assign a certain frequency to each detector. As the pulse rate of the detector circuit is also affected by the intensity of the IR radiation impacting the detector diode, each detector is actually indexed to a range of pulse frequencies.

In the external modulation, it is possible to assign a frequency index to each pixel by mixing each detector output signal with an externally supplied modulation frequency.

Figure 5A:
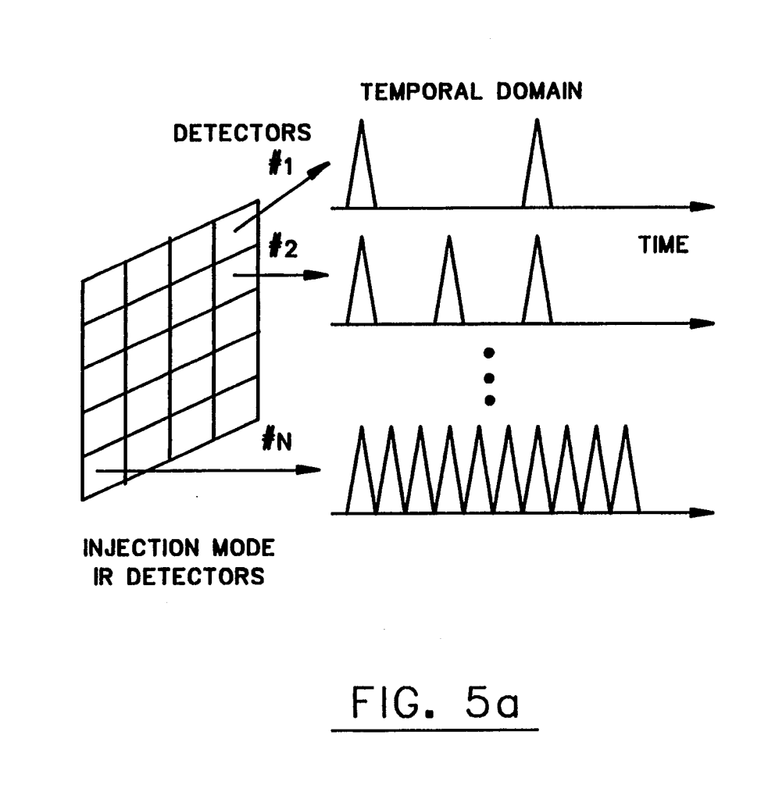
FIG. 5 illustrates conceptually frequency indexing of the individual detectors of the focal plane array.
Figure 5B:
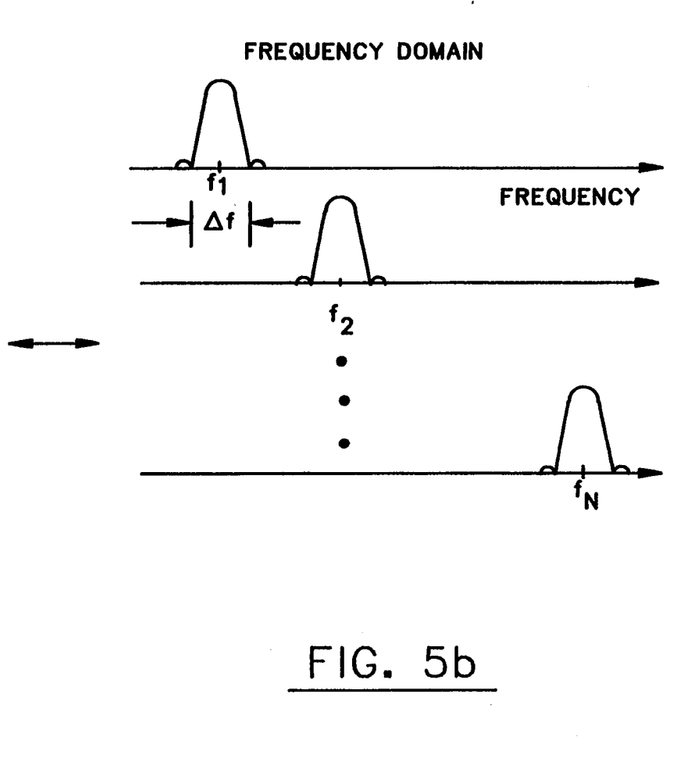

Frequency indexing is illustrated in FIG. 5. N detectors produce first through Nth pulse trains, each in a unique frequency range. Preferably these frequency ranges do not overlap. The detector circuits may be constructed so that the detectors in a particular area of the detector array produce pulse trains having frequency ranges within a particular band of frequencies.

Figure 6:
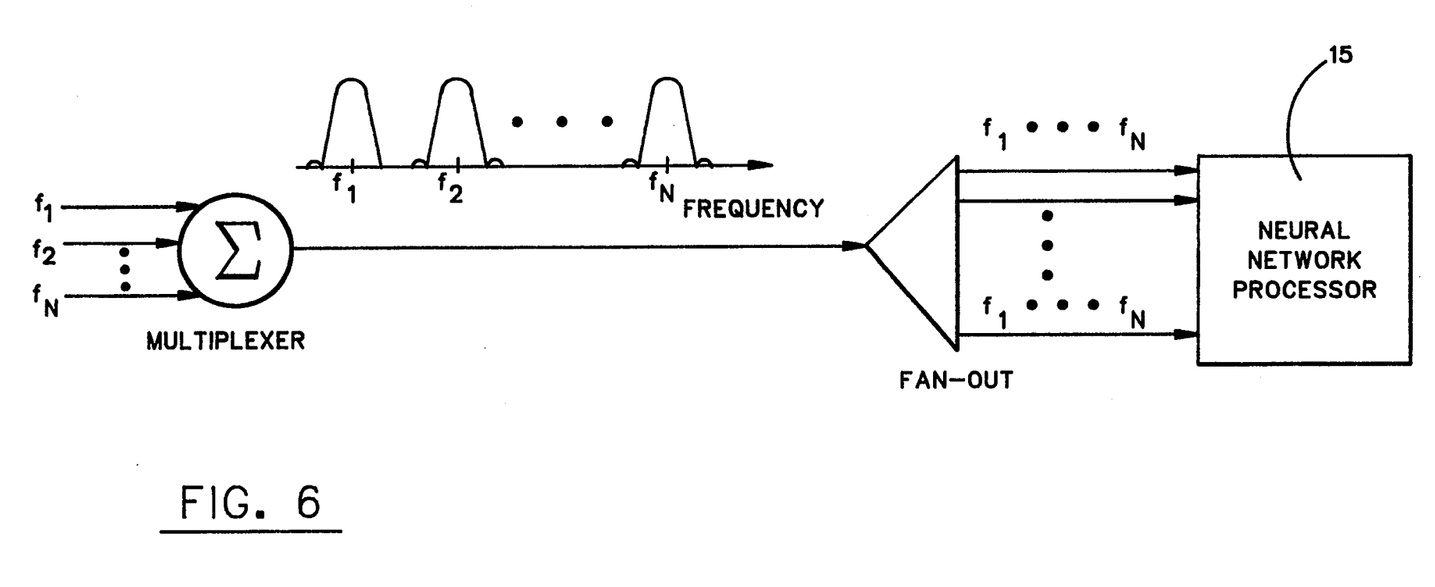
FIG. 6 illustrates the frequency division multiplexing of the detector signals onto a communication channel, and the input to a network processor.

All the outputs from the detector array are mixed together into a few channels continuously by frequency-division multiplexing, as shown in FIG. 6. The number of communication channels is much less than the number of detectors. With the frequency-division multiplexing, the detector output signal can be continuously fed into the next processor. Therefore, this continuous multiplexing makes possible processing of the detector signal in a real-time mode, whereas conventional time-division multiplexing requires time sampling, so that aliasing may be introduced and/or detailed motion information may be lost.

The frequency multiplexed signal carried by a few channels can be fanned out to the next stage, the network processor 15, so that all the nodes in the input layer of the processor can receive real-time focal plane information.

NEURAL NETWORK PROCESSING

Figure 7:
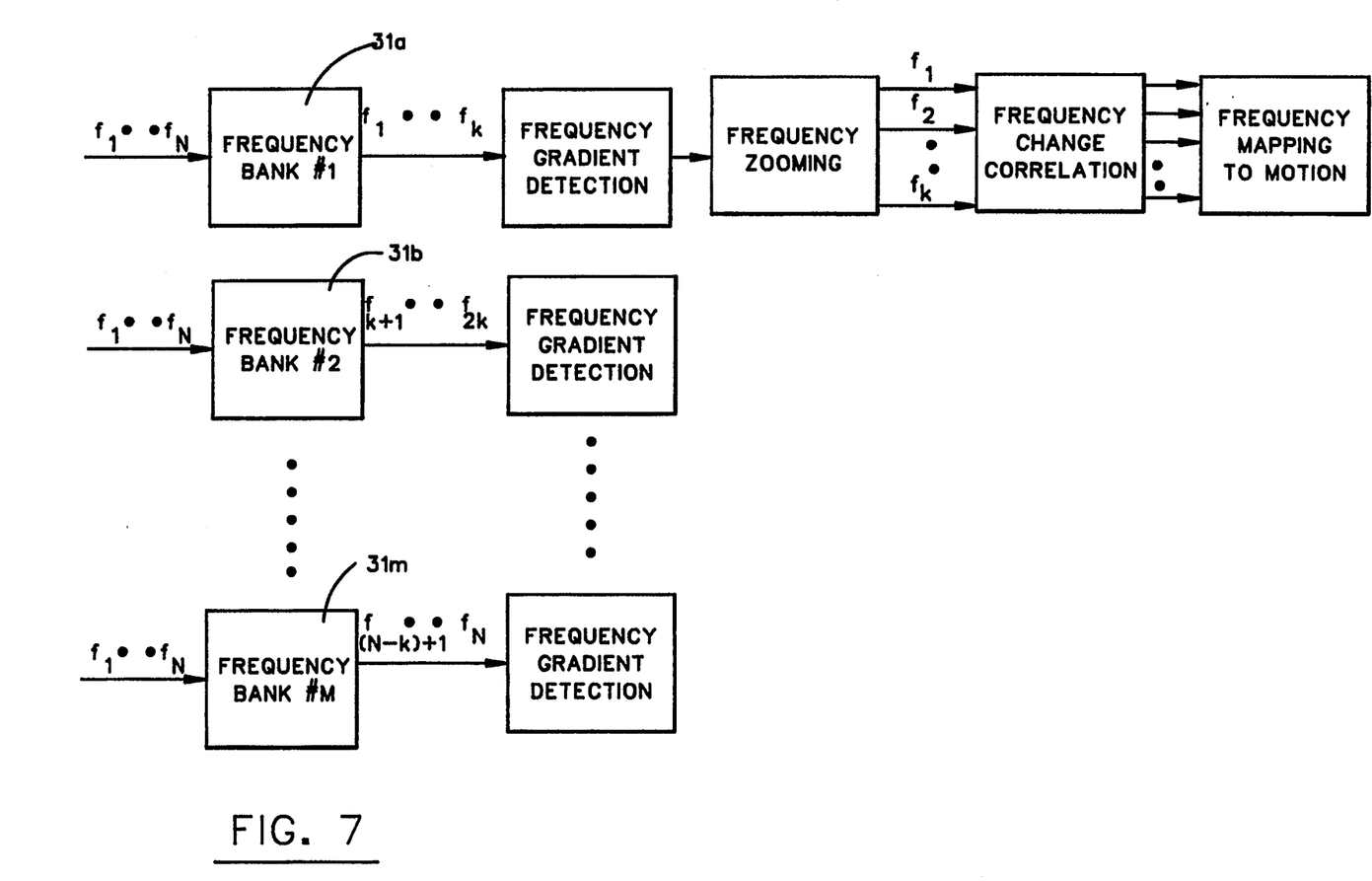
FIG. 7 is a block diagram of the key functions of the neural network processor incorporated in the invention.

The neural network processor 15 performs a set of unique signal processing functions, as shown in FIG. 7. These functions may include frequency bank processing, frequency gradient detection, frequency zooming, frequency change correlation, and frequency mapping into motion and image. Architecturally, the neural network processor consists of several layers, and each layer can be trained to perform key functions.

Frequency bank processing

The first step of the network processing is "frequency bank processing." As shown in FIG. 7, all the detector outputs of the focal plane, represented in terms of center frequencies $f_1, f_2, \ldots, f_N$, are first fed into the network processor.

The first operational function of the network processor is to separate the entire range of frequencies into a plurality of "frequency banks" 31, each of which may correspond to a particular area of the detector array. In the embodiment illustrated in FIG. 7, the neural network processor separates the N distinct frequency ranges into M banks of frequency ranges. N is the number of pixels in the detector array and M is the number of areas or subsections of the focal plane to be examined. Each frequency bank is shown having k frequencies (or frequency ranges), k being the number of pixels in each subsection of the focal plane array.

By processing the "bank" of modulation frequencies in the multiplexed channel, the total field of view (FOV) of the focal plane is divided into subsections, where each subsection consists of a group of detectors. Each subsection corresponds to a spatially divided scene. Frequency "bank" processing is, therefore, equivalent to global processing on the divided scene, because a frequency "bank" contains information of a number of pixels, which corresponds to the spatially divided scene. Thus, this processing reduces initial processing time owing to the subsection searches and make possible initial global detection without processing all the detectors in the focal plane array.

Frequency gradient detection

"Frequency gradient detection" is the detection processing which observes the frequency gradient information, i.e., the rate of frequency change. As shown in FIG. 4, the detector output pulse rate, i.e., represented by a frequency, is abruptly changed when a target's IR signature is introduced to and removed from the detector. Therefore, it is possible to detect target motion by observing the frequency gradient since the detector output frequency change is directly related to the target location and motion. The rate of target motion can be determined by the magnitude of the frequency gradient.

The functional diagram of FIG. 7 shows that, as an example, a frequency gradient is detected in frequency bank #1, so that the subsequent functions (i.e., frequency zooming, frequency change correlation, and frequency mapping into motion and image) are processed through the neural network processor.

Frequency zooming

"Frequency zooming" is equivalent to zooming into particular spatial subsections having frequency gradient change. Since signals from the spatial subsections are carried in the corresponding frequency banks, when the frequency gradient change is detected on a certain frequency bank, all the processors zoom in and process that bank. This technique localizes processing to array subsections of interest. Each detector signal in the zoomed bank is then processed spatially so that the processing can be localized in the neighbor of the target position. As a result, only signals of the detectors having frequency gradient change can be processed. This localization process significantly reduces processing load and saves valuable time in target recognition and discrimination since not all the pixels in the focal plane are examined.

Frequency change correlation

"Frequency change correlation" is the correlation processing between detector signals in the zoomed bank having the frequency gradient change. Correlated information between the detector signals can be represented by a matrix form:

$$C_A = A A^T$$

where $C_A$ = correlation matrix $A$ = vector representation of frequency change information per frequency band $$= \begin{bmatrix} \Delta f_1(t) \\ \Delta f_2(t) \\ \vdots \\ \Delta f_N(t) \end{bmatrix}$$

where $\Delta f_k$ = change of frequency of the $k$th pixel.

Figures 11A, 11B:
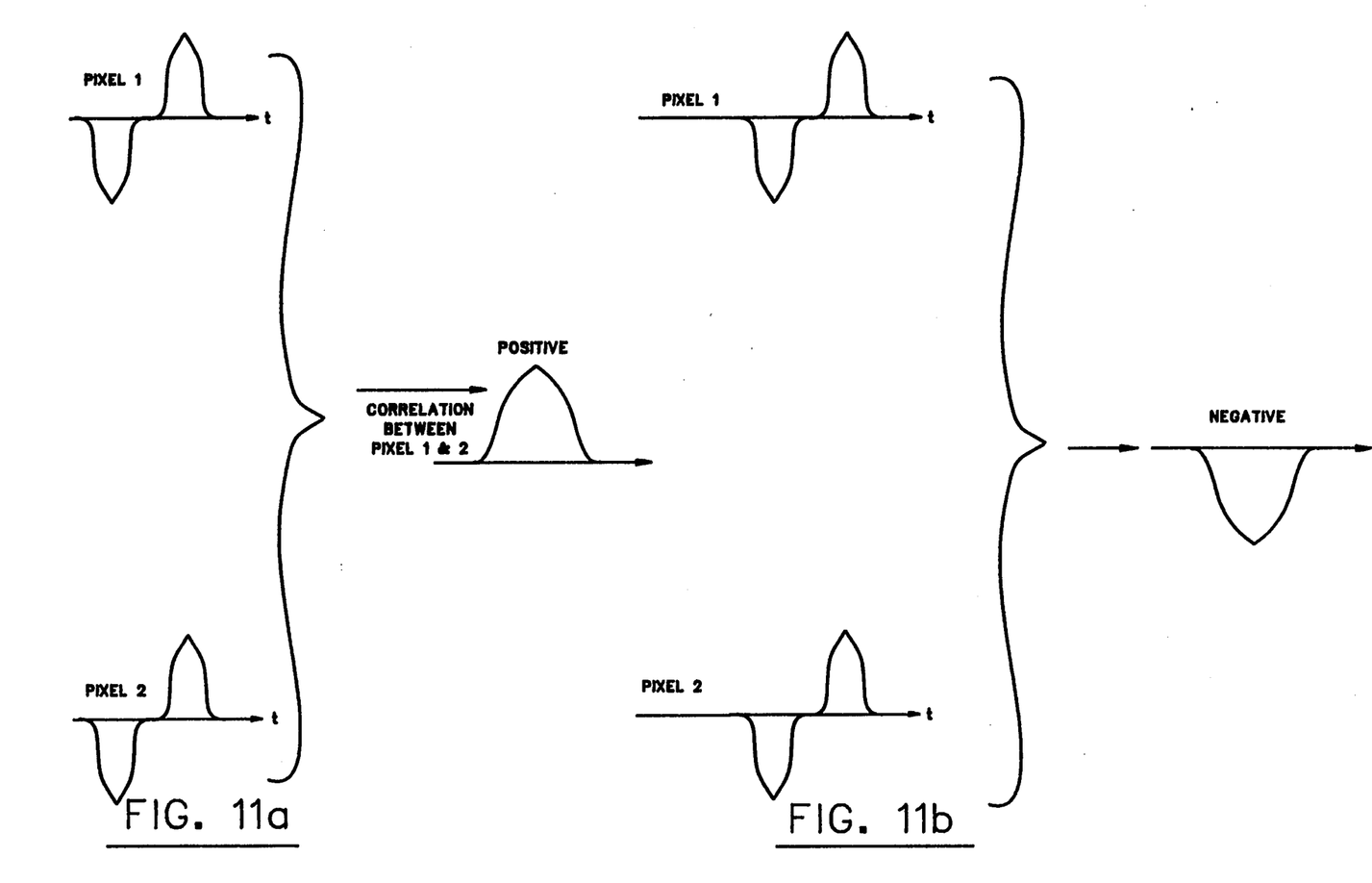
FIG. 11 illustrates the correlation between the detector signals in the frequency bank having a frequency gradient changed.

Possible correlation results are shown in FIG. 11. FIG. 11a shows the frequency gradients of pixels 1 and 2 due to the target motion. The correlation between the gradients of pixels 1 and 2 results in the positive signal shown in Figure 11a. Negative correlation is shown in FIG. 11b.

If the correlated result is positive, as shown in Figure 11a, then the target occupies more than one pixel position. If negative, as shown in Figure 11b, then the target is moving across the pixels. Therefore, it is possible to obtain target information, which includes target position, moving direction and size, by processing the frequency change correlation.

Frequency mapping into motion and image

The final step of the network processing is to map the frequency correlated information into the image and motion. The sign and amplitude of the correlation result represent the target motion and/or size. For example, by showing them in the image plane, such as a conventional CRT screen, it is possible to obtain clean target position, target motion, and clear depiction of target size in real time. The output of this processing is continuous signal, not in the discrete frame, and is ready for standard methods of tracking and discrimination.

Conventional processor embodiment

Figure 8:
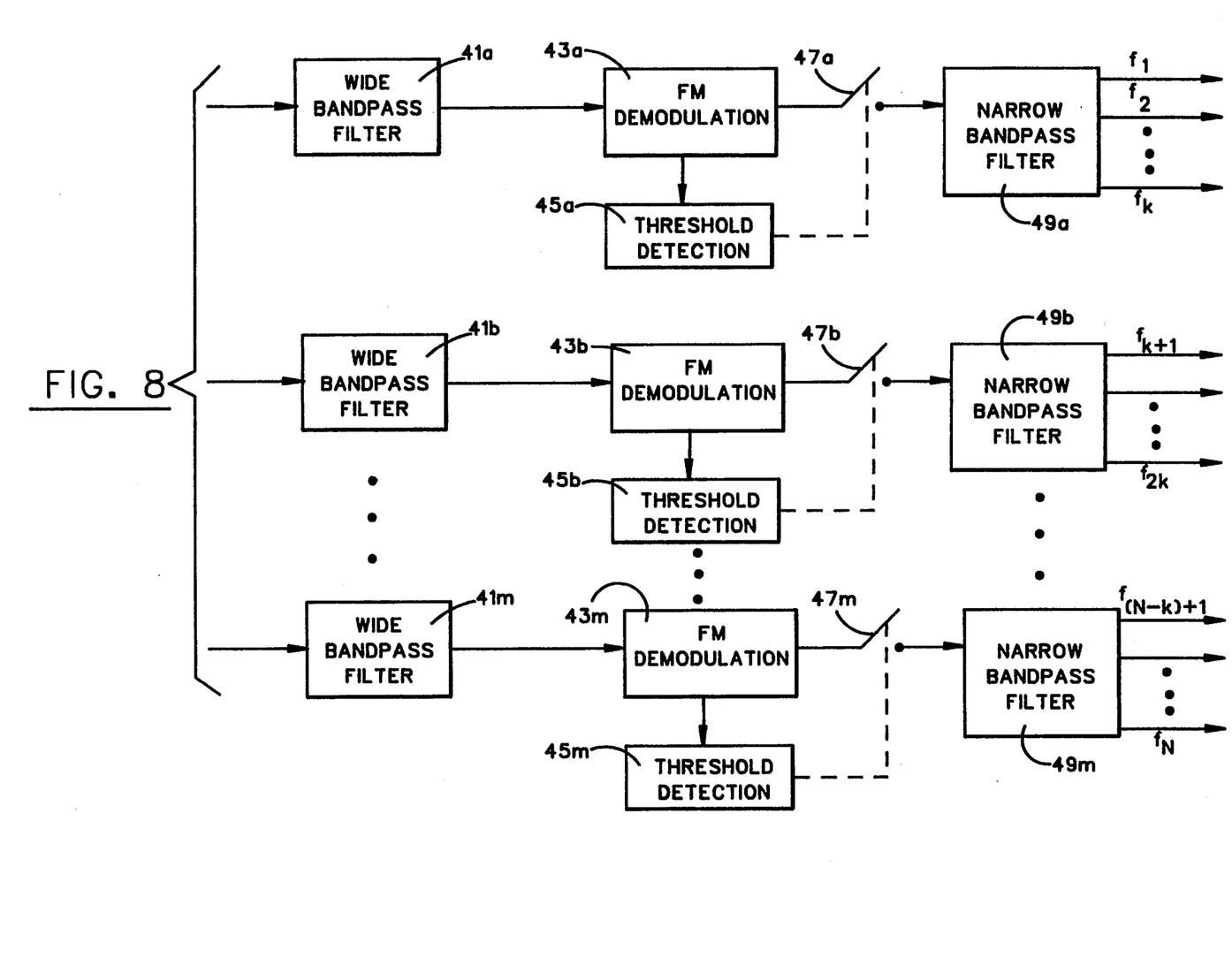
FIG. 8 is a block diagram of a conventional processor implementation of the processor incorporated in the invention.

FIG. 8 illustrates a conventional processor embodiment of the network processor of the invention. A plurality of wide bandpass filters 41 is provided, each of which is tuned to pass a particular bank or band of the frequency ranges of pulse trains generated by the detectors of the detector array. Thus, if the array of detectors is arranged so that the detectors in a particular region or area of the detector array produce pulse trains having frequencies within a particular band of frequencies, the wide bandpass filters 41 may be constructed to filter the corresponding bands of frequency to isolate further processing to particular regions of the detector array. Connected to the output of each wide bandpass filter is an FM demodulator 43 connected to a threshold detection circuit 45 for identifying whether any of the pulse train frequencies within the band of frequencies of passed by the bandpass filter is changing. If so, a switch 47 is closed to pass the frequency information to a series of narrow bandpass filters 49, each of which is designed to pass one of the frequency ranges associated with a particular detector of the detector array.

A separate narrow bandpass filter is required for each detector of the array. The switch 47 on the input to the narrow band pass filters keeps the filters from being activated, when that band of frequencies is not undergoing change, to reduce unnecessary processing. This ensures that power is consumed only by circuits for the pulse train frequencies associated with the detectors in the area in which change is detected.

Neural network processing

Because of the large amount of hardware required for conventional processing of the signals in the manner described above, neural networks provide a useful implementation for the invention. Neural networks are also advantageous because of their ability to be trained. This allows the system to adaptively adjust to changes in its environment without having to change the hardware such as the bandpass filters.

Figure 10:
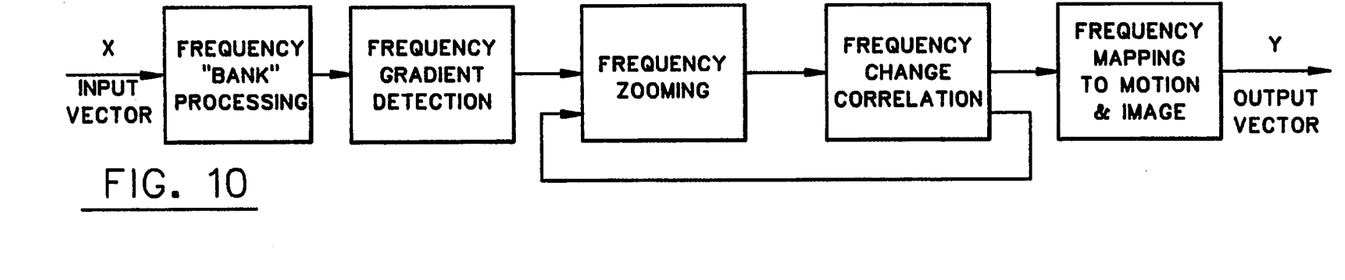
FIG. 10 it a functional block diagram of a neural network processor used in the invention.

One neural network embodiment suitable for the invention is a multi-layer network such as the back propagation network, illustrated functionally in FIG. 10. This form of a neural network is particularly useful because of the feedback loop that permits adaptive adjustment of the nodes in the network. Additional advantages of using the back propagation network are its simplicity, the ability to combine processing paradigms in cascades, and its formation of a good statistical model.

Figure 9:
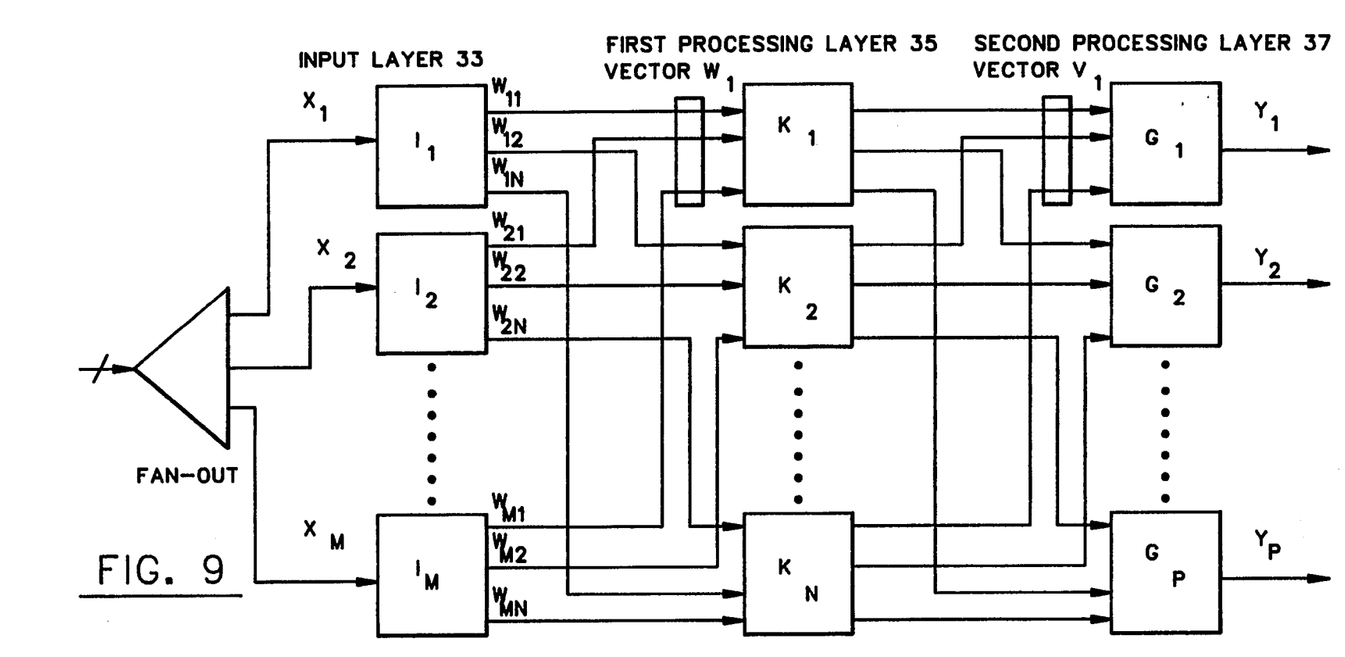
FIG. 9 is a block diagram of a multi-layer neural network architecture used in the invention.

Another neural network architecture is composed of an input layer 33, which in turn fans out into a first processing layer 35, as shown in FIG. 9. The first processing layer then feeds into a second processing layer 37 to complete the processing. Advantageously, the first processing layer 35 may be a Kohonen layer, and the second processing layer 37 may be a layer of Grossberg style neurons. This type of architecture trains rapidly. The Kohonen layer implements a weighted matrix, i.e., it applies weights to the inputs, and the highest value neurons feed into the next layer. It creates a correlation matrix which maps the frequency into image and motion.

The Kohonen layer performs frequency gradient detection and localizes processing to subsections of interest. Then the Grossberg layer applies a second weight matrix. The result is a correlation of frequency changes. The correlation provides "frequency bank processing" which divides the total field-of-view (FOV) of the focal plane into subsections and assigns a frequency "bank" corresponding to each subsection. This process greatly reduces the processing load for the system. The output of this neural network processing is clean target position and motion information extracted by heavy background clutter.

The different types of neural network processors that can be used in the subject invention are described extensively in the literature, and known to those skilled in the art. An introductory article describing different network types, including those used in the embodiment described, is found at Lippman, "An Introduction to Computing with Neural Nets," *IEEE ASSP Magazine*, April 1987, pp. 4–22.

CONCLUSION

Thus, a new and innovative approach for target detection uses an array of injection mode infrared detectors (IMIDs), whose output signals convey intensity change information of detected objects in a pulse train output form, to replace the conventional charge collection mode detector. This distinctive IMID characteristic enables the reduction of input data transfer lines from many sources to a minimum number of frequency multiplexed channels to transmit the detector output signals to the processor in a continuous mode, and to use a network processor for its signal processing. Preferably a neural network is used for the signal processing. The neural network processor localizes the global information and concentrates on the areas of interest through matrix transformations applied by the various neural layers. This multi-layer neural network processor performs the filtering and motion detection operations continuously in real time. In conclusion, this innovative approach has many advantages, such as better resolution, faster response time, and significantly reduced power/ volume/weight in the focal plane, over conventional methods in areas of detection and tracking of moving objects under heavy background.

I claim:

1. A processor for detecting target position and motion against a background, comprising:
   an array of detectors, wherein each of said detectors produces a pulse train having a frequency within a unique one of a plurality of predetermined frequency ranges;
   a communication channel;
   a frequency division mutiplexer having input terminals connected to said detectors and an output terminal connected to said communication channel for multiplexing said pulse trains onto said communication channel; and
   a processor connected to said communication channel for identifying the frequency range in which a pulse train frequency changes.

2. The processor of claim 1, wherein said detectors comprise injection mode infrared radiation detectors.

3. The processor of claim 2, wherein the frequency of the pulse train produced by each detector within its frequency range is dependent on the intensity of radiation impacting said detector.

4. The processor of claim 3, wherein said processor connected to said communication channel additionally correlates the frequency range in which a pulse train frequency changes with its corresponding detector.

5. The processor of claim 3, wherein said processor connected to said communication channel comprises:
   first through Mth frequency banks, each connected to said communication channel, wherein each of said frequency banks demultiplexes said pulse trains having frequencies within a predetermined band of frequencies;
   first through Mth frequency gradient detection processors, each coupled to a corresponding one of said frequency banks, for detecting in which one of said bands of frequencies a change in pulse train frequency occurs.

6. The processor of claim 5, wherein said processor connected to said communication channel additionally comprises a frequency zooming processor for demultiplexing said pulse train frequencies within said band of frequencies in which change occurs to individual pulse train frequencies.

7. The processor of claim 6, wherein said processor connected to said communication channel additionally comprises a frequency change correlation processor for detecting which of said pulse train frequencies changes.

8. The processor of claim 7, wherein said processor connected to said communication channel additionally comprises a frequency mapping to motion processor for correlating the frequency of the detected change to a location on said array of detectors.

9. The processor of claim 5, wherein each of said first through Mth frequency banks comprises a bandpass filter for passing frequencies within said predetermined band of frequencies.

10. The processor of claim 9, wherein each of said first through Mth frequency gradient detection processors comprises:
    a frequency modulation demodulator; and
    a threshold detection circuit.

11. The processor of claim 6, wherein:
    each of said first through Mth frequency banks comprises a wide band bandpass filter for passing frequencies within said predetermined band of frequencies; and
    said frequency zooming processor comprises a plurality of narrow band bandpass filters having their input terminals connected to said gradient detection processors, each of said narrow band bandpass filters tuned to pass one of said predetermined frequency ranges.

12. The processor of claim 11, wherein each of said first through Mth frequency gradient detection processors comprises:
    a frequency modulation demodulator; and
    a threshold detection circuit.

13. The processor of claim 3, wherein said processor connected to said communication channel comprises a neural network processor.

14. The processor of claim 13, wherein said neural network processor:
   demultiplexes frequencies into first through Mth frequency banks, each of which comprises a unique predetermined band of frequencies; and
   detects in which of said predetermined band of frequencies a change in pulse train frequency occurs.

15. The processor of claim 14, wherein:
   sad pulse train frequencies in each of said first through Mth frequency banks are produced by said detectors in a particular area of said detector array; and
   said neural network processor additionally correlates the individual pulse train frequencies in which change occurs to a location on said array of detectors.

16. The processor of claim 15, wherein said neural network processor additionally correlates the frequency range in which a change in the frequency of the pulse train occurs with its corresponding detector.

17. The processor of claim 16, wherein said neural network processor comprises a back propagation with recurring network processor.

18. The processor of claim 16, wherein said neural network processor is a multi-layer neural network processor.

19. The processor of claim 18, wherein said neural network processor comprises an input layer of nodes, a first processing layer, and a second processing layer.

20. The processor of claim 19, wherein:
   said first processing layer is a Kohonen layer of nodes; and
   said second processing layer is a Grossberg layer of nodes.

21. A processor for detecting target position and motion against a background, comprising:
   a first plurality of injection mode infrared detectors, each for producing a pulse train having a unique frequency corresponding to the radiation detected by said detector, wherein each such frequency is uniquely within one of a first plurality of frequency ranges;
   a second plurality of communication channels, wherein said second plurality is less than said first plurality;
   a frequency division multiplexer connected between said injection mode infrared detectors and said communication channels for frequency division multiplexing said pulse trains onto said communication channels; and
   a neural network processor connected to said communication channels for determining whether the frequency of one of said pulse trains changes, and for determining which of said frequencies ranges such change occurs.

22. The processor of claim 21, wherein said neural network processor additionally correlates the frequency range in which change is detected to its associated detector.

23. A method of detecting and processing information comprising:
   generating in parallel a plurality of pulse trains, wherein each of said pulse trains has a unique frequency, and each of said frequencies is uniquely within one of a plurality of frequency ranges;
   frequency division multiplexing said pulse trains onto a communication channel; and
   identifying in a processor which of said frequency ranges contains a changing pulse train frequency.

24. The method of claim 23, wherein:
   generating said plurality of pulse trains comprises:
      detecting radiation with each of a plurality of radiation detectors arranged in an array; and
      generating a pulse train corresponding to each of said detectors having a frequency within one of said frequency ranges, wherein the frequency of each of said pulse trains within its frequency range corresponds to the radiation detected by said detector; and
   said method additionally comprises correlating a frequency range in which a changing pulse train frequency is identified with the detector that produces a pulse train in that frequency range.

25. The method of claim 24, wherein identifying which of said frequency ranges contains a changing pulse train frequency comprises:
   separating said multiplexed pulse train frequencies into a second plurality of frequency banks, each of said frequency banks containing a plurality of said frequency ranges;
   identifying one of said frequency banks having a frequency range in which a pulse train frequency changes.

26. The method of claim 25, wherein identifying which of said frequency ranges contains a changing pulse train frequency additionally comprises identifying which of said frequency ranges within said frequency bank has a changing pulse train frequency.

* * * * *